J. MATUS.
BOTTLE CLOSURE.
APPLICATION FILED JULY 31, 1911.
1,022,101.
Patented Apr. 2, 1912.
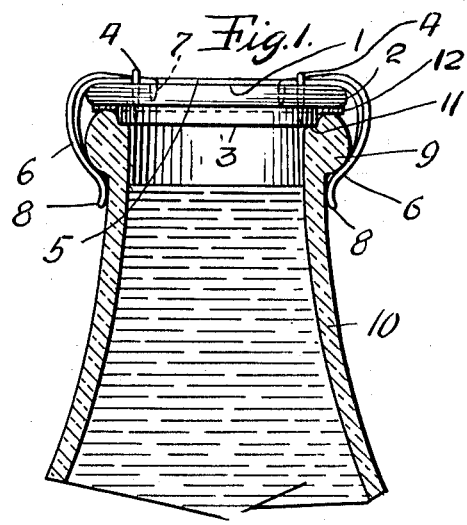
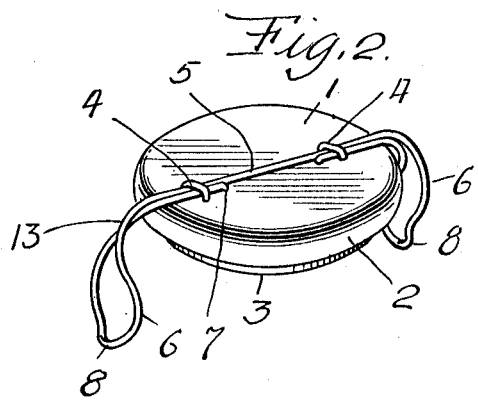
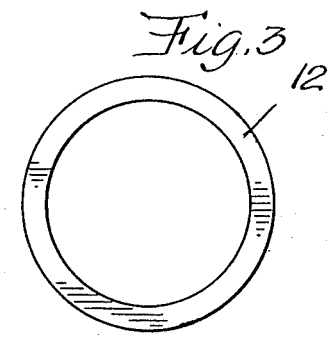
WITNESSES:
Samuel Payne
Ralph C. Evert.
INVENTOR.
J. Matus.
BY
ATTORNEYS.

UNITED STATES PATENT OFFICE.

JOHN MATUS, OF TORRINGTON, CONNECTICUT.

BOTTLE-CLOSURE.

1,022,101.  Specification of Letters Patent.  Patented Apr. 2, 1912.

Application filed July 31, 1911. Serial No. 641,580.

*To all whom it may concern:*

Be it known that I, JOHN MATUS, a subject of the King of Hungary, residing at Torrington, in the county of Litchfield and State of Connecticut, have invented certain new and useful Improvements in Bottle-Closures, of which the following is a specification, reference being had therein to the accompanying drawing.

This invention relates to a bottle closure especially designed for milk bottles, and the objects of my invention are to provide a closure that can be easily and quickly placed upon the neck of a milk bottle to protect the pouring edges thereof, and to furnish a closure with novel clamping arms that can be easily and quickly placed in position to firmly retain the closure upon a bottle.

Further objects of my invention are to provide a closure that will positively seal the upper end of a milk bottle, and to accomplish the above results by a closure that is simple in construction, sanitary and highly efficient for the purposes for which it is intended.

I attain the above objects by a mechanical construction that will be hereinafter specifically described and then claimed, and reference will now be had to the drawing, wherein:—

Figure 1 is a vertical sectional view of a portion of a milk bottle provided with my improved closure, Fig. 2 is a perspective view of a detached closure, and Fig. 3 is a plan of a gasket or washer used in connection with the closure.

A closure in accordance with this invention comprises a circular disk having a rounded edge 2 and a central depending stopper 3. The disk 1 and the stopper 3 are integral and are preferably made of porcelain, glass or a material which will not affect the contents of a milk bottle should the contents thereof contact with the closure.

When molding or making the disk 1, staples or hold-fast devices 4 are arranged in the upper surface of the disk 1 and extending through these staples is a piece of wire 5 having the ends thereof bent downwardly and then upwardly to provide loops 6, the ends of the wire extending under the staples 4 and into sockets 7 provided therefor in the disk 1. The loops 6 provide clamping arms and the lower ends of the arms are curved outwardly, as at 8 whereby they will easily ride over the rim 9 of a milk bottle or other receptacle 10. The top of the rim 9 has an annular seat 11 for the stopper 3, and surrounding the stopper 3, between the disk 1 and the rim 9, is a gasket or washer 12 made of rubber, cork or a similar material.

By reference to Fig. 2 of the drawing, it will be observed that the ends of the wire after forming the loops 6 are carried under that portion of the wire designated 13, thereby adding resiliency to the loops or arms. This particular twist places one side of the loops slightly in advance of the other, as best shown in Fig. 1 and both sides of the loop contribute in positively retaining the disk 1 upon the washer 12 and the stopper 3 upon the annular seat 11.

It is apparent that the resilient arms of the closure can be easily sprung out of engagement with the rim 9 when it is desired to remove the closure.

What I claim is:—

The combination with a bottle having a rim, of a disk adapted to be detachably held upon said rim, staples carried by the top of said disk, and a piece of wire arranged under said staples and having the ends thereof bent to provide loop-shaped resilient arms adapted to engage under said rim with the ends of said wire returned under said staples to enter said disk.

In testimony whereof I affix my signature in the presence of two witnesses.

JOHN MATUS.

Witnesses:
EDWARD J. BUNE,
THOMAS J. WALL.